United States Patent
Tanii et al.

(10) Patent No.: US 8,591,611 B2
(45) Date of Patent: Nov. 26, 2013

(54) AQUEOUS CUTTING FLUID AND SLURRY

(75) Inventors: Ichiro Tanii, Echizen (JP); Takayuki Hayashi, Echizen (JP); Toru Mizusaki, Echizen (JP); Takashi Kimura, Echizen (JP)

(73) Assignee: Nissin Chemical Industry Co., Ltd., Echizen-shi, Fukui (JP)

( * ) Notice: Subject to any disclaimer, the term of this patent is extended or adjusted under 35 U.S.C. 154(b) by 266 days.

(21) Appl. No.: 12/934,749

(22) PCT Filed: Jun. 9, 2010

(86) PCT No.: PCT/JP2010/059752
§ 371 (c)(1),
(2), (4) Date: Sep. 27, 2010

(87) PCT Pub. No.: WO2010/143649
PCT Pub. Date: Dec. 16, 2010

(65) Prior Publication Data
US 2011/0113699 A1    May 19, 2011

(30) Foreign Application Priority Data

Jun. 12, 2009 (JP) .................. 2009-141070

(51) Int. Cl.
*C09K 3/14* (2006.01)
*C09C 1/28* (2006.01)

(52) U.S. Cl.
USPC .................. 51/298; 51/307; 51/308; 51/309

(58) Field of Classification Search
USPC .......................................... 51/298, 307–309
See application file for complete search history.

(56) References Cited

U.S. PATENT DOCUMENTS

| 5,534,172 | A | 7/1996 | Perry et al. | |
|---|---|---|---|---|
| 6,506,444 | B1 | 1/2003 | Mahr et al. | |
| 7,387,970 | B2 * | 6/2008 | Cooper et al. | 438/754 |
| 2003/0100455 | A1 | 5/2003 | Oishi et al. | |
| 2005/0009322 | A1 * | 1/2005 | Matsui et al. | 438/633 |
| 2006/0014390 | A1 * | 1/2006 | Lee et al. | 438/692 |
| 2007/0169422 | A1 | 7/2007 | Kikuchi et al. | |
| 2009/0258580 | A1 | 10/2009 | Kikuchi et al. | |
| 2011/0076503 | A1 * | 3/2011 | Mizusaki et al. | 428/429 |

FOREIGN PATENT DOCUMENTS

| JP | 6-319906 A | 11/1994 |
|---|---|---|
| JP | 2000-327838 A | 11/2000 |
| JP | 2001-164240 A | 6/2001 |
| JP | 2005129637 A * | 5/2005 |
| JP | 2006-278773 A | 10/2006 |
| JP | 2007-031502 A | 2/2007 |
| JP | 2007-231384 A | 9/2007 |

OTHER PUBLICATIONS

Machine Translation of Kikuchi et al (JP 2006-278773).*
Machine Translation of Hayashi et al (JP 2005-129637).*
Machine Translation of Inagaki (JP 2007-231384).*
Extended European Search Report dated Oct. 24, 2012, issued in corresponding European patent application No. 10786180.9.

* cited by examiner

*Primary Examiner* — Mike M Dollinger
(74) *Attorney, Agent, or Firm* — Westerman, Hattori, Daniels & Adrian, LLP

(57) ABSTRACT

An aqueous slicing fluid comprising (A) 0.01-20 wt % of a modified silicone is combined with abrasive grains to form an aqueous slicing slurry which has advantages of dispersion stability of abrasive grains, viscosity stability, and a higher machining accuracy.

3 Claims, No Drawings

AQUEOUS CUTTING FLUID AND SLURRY

TECHNICAL FIELD

This invention relates to an aqueous slicing fluid and slurry for assisting in slicing of workpieces including ingots of silicon, quartz, rock crystal, compound semiconductor, magnet alloy and the like used in semiconductor, solar cell and other industries. More particularly, it relates to an aqueous slicing fluid and slurry having advantages of dispersion stability of abrasive grains, viscosity stability of the aqueous slicing slurry, and higher machining accuracy than the prior art.

BACKGROUND ART

One known method of slicing ingots of hard and fragile materials uses wire saws or cutoff wheels. In the slicing method using wire saws, a slicing fluid is often fed during slicing operation for the purposes of lubrication between a slicing tool and a workpiece, removal of friction heat, and cleaning of chips.

The slicing fluids include oil base slicing fluids containing mineral oil and additives, glycol base slicing fluids containing polyethylene glycol or polypropylene glycol as a main component, and aqueous slicing fluids in the form of an aqueous solution of surfactant.

However, the oil base slicing fluids are inferior in cooling of the slicing site. If the workpiece or tool is contaminated with the oil base slicing fluid, an organic solvent cleaning liquid is necessary, which is unwanted from the concern about the environment. The glycol base slicing fluids and the aqueous slicing fluids are inferior in viscosity stability during slicing operation and dispersion stability of abrasive grains.

To overcome these problems, JP-A 2000-327838 (Patent Document 1) proposes a slicing fluid based on a polyhydric alcohol or derivative, to which bentonite, cellulose, and mica are added to facilitate abrasive grain dispersion. JP-A 2006-278773 (Patent Document 2) discloses an aqueous slicing fluid comprising a glycol and/or a water-soluble ether and particles having a zeta-potential of at least 0 mV, typically alumina. JP-A 2007-031502 (Patent Document 3) discloses an aqueous slicing fluid comprising a glycol, a glycol ether, and water.

In the industry, semiconductor silicon wafers are sliced from silicon ingots whose diameter has increased from 200 mm to 300 mm and even to 450 mm. Silicon wafers used in solar batteries or the like become increasingly thinner. There is a need for an aqueous slicing fluid capable of complying with such changes in diameter and thickness. It would be desirable to have an aqueous slicing fluid having higher machining accuracy than the prior art.

SUMMARY OF THE INVENTION

Problems to be Solved by the Invention

The present invention has been done in view of the above circumstances. An object of the invention is to provide an aqueous slicing fluid and slurry having advantages of dispersion stability of abrasive grains, viscosity stability of the aqueous slicing slurry, and higher machining accuracy than the prior art.

Means for Solving the Problem

The inventors have earnestly studied in order to attain the above object, and as a result, they have found that the outstanding problems are solved by adding 0.01 to 20% by weight of a modified silicone (A) to an aqueous slicing fluid.

Accordingly, the present invention provides an aqueous slicing fluid and slurry having advantages of dispersion stability of abrasive grains, viscosity stability of the aqueous slicing slurry, and higher machining accuracy than the prior art.

Claim 1:
An aqueous slicing fluid comprising (A) 0.01 to 20% by weight of a modified silicone.

Claim 2:
The slicing fluid of claim 1 wherein the modified silicone is a polyether, amino, carboxyl, or epoxy-modified silicone.

Claim 3:
The slicing fluid of claim 2 wherein the modified silicone is one represented by the following average compositional formula (1):

$$R^1_p R^2_q R^3_r SiO_{(4-p-q-r)/2} \tag{1}$$

wherein $R^1$ is $-(CR^4_2)_n X$, $R^4$ is hydrogen atom, a substituted or unsubstituted monovalent hydrocarbon group having 1 to 20 carbon atoms and having no aliphatic unsaturated bond, or hydroxyl group, n is an integer of 1 to 20, X is a functional group selected from the group consisting of an amino group, carboxyl group and epoxy group, $R^2$ is a substituted or unsubstituted monovalent hydrocarbon group having 1 to 20 carbon atoms and having no aliphatic unsaturated bond, $R^3$ is an organic group having the general formula: $-C_f H_{2f} O(C_g H_{2g} O)_h R^5$, $R^5$ is hydrogen atom, a substituted or unsubstituted monovalent hydrocarbon group having no aliphatic unsaturated bond, or acetyl group, f is a positive number of 2 to 12, g is a positive number of 2 to 4, h is a positive number of 1 to 200, and p, q and r are numbers satisfying $0 \leq p < 2.5$, $0.01 \leq q < 2.5$, $0 \leq r < 2.5$ and $0.05 < p+q+r \leq 3.0$.

Claim 4:
The slicing fluid of any one of claims 1 to 3, further comprising (B) 1 to 20% by weight of water and (C) 60 to 98.99% by weight of a hydrophilic polyhydric alcohol and/or a derivative thereof.

Claim 5:
The slicing fluid of claim 4 wherein the hydrophilic polyhydric alcohol or derivative thereof (C) has a solubility in water of at least 5% by weight at 20° C. and a vapor pressure of up to 0.01 mmHg.

Claim 6:
An aqueous slicing slurry comprising
100 parts by weight of the aqueous slicing fluid of any one of claims 1 to 5 and
50 to 200 parts by weight of abrasive grains.

Advantageous Effects of the Invention

According to the present invention, by incorporating 0.01 to 20% by weight of a modified silicone in an aqueous slicing fluid, there can be obtained an aqueous slicing fluid and slurry having advantages of dispersion stability of abrasive grains, viscosity stability of the aqueous slicing slurry form, and a higher machining accuracy than the prior art.

EMBODIMENT FOR CARRYING OUT THE INVENTION

The aqueous slicing fluid of the invention is defined as comprising 0.01 to 20% by weight of a modified silicone (A). Suitable modified silicones include polyether-modified silicones, amino-modified silicones, carboxyl-modified silicones, and epoxy-modified silicones. Inter alia, polyether and amino-modified silicones are preferred. Inclusion of the modified silicone is effective for drastically reducing the dynamic contact angle of an aqueous slicing fluid, leading to a significant improvement in slicing performance.

In this case, the modified silicone (A) is preferably one represented by the following average compositional formula (1):

$$R^1_p R^2_q R^3_r SiO_{(4-p-q-r)/2} \quad (1)$$

wherein $R^1$ is —$(CR^4_2)_n X$, $R^4$ is hydrogen atom, a substituted or unsubstituted monovalent hydrocarbon group having 1 to 20 carbon atoms and having no aliphatic unsaturated bond, or hydroxyl group, n is an integer of 1 to 20, X is a functional group selected from the group consisting of an amino group, carboxyl group and epoxy group, $R^2$ is a substituted or unsubstituted monovalent hydrocarbon group having 1 to 20 carbon atoms and having no aliphatic unsaturated bond, $R^3$ is an organic group having the general formula: —$C_f H_{2f} O (C_g H_{2g} O)_h R^5$, $R^5$ is hydrogen atom, a substituted or unsubstituted monovalent hydrocarbon group having no aliphatic unsaturated bond, or acetyl group, f is a positive number of 2 to 12, g is a positive number of 2 to 4, h is a positive number of 1 to 200, and p, q and r are numbers satisfying $0 \leq p < 2.5$, $0.01 \leq q < 2.5$, $0 \leq r < 2.5$ and $0.05 < p+q+r \leq 3.0$.

Examples of $R^2$ include an alkyl group such as methyl group, ethyl group, propyl group, butyl group, pentyl group, hexyl group, heptyl group, octyl group, nonyl group and decyl group, a cycloalkyl group such as cyclopentyl group and cyclohexyl group, a fluorinated alkyl group such as trifluoropropyl group and heptadecafluorodecyl group, although methyl group is preferred.

$R^5$ is hydrogen atom, a monovalent hydrocarbon group, or acetyl group. Examples of $R^5$ include hydrogen atom, methyl group, ethyl group, propyl group, butyl group, and acetyl group.

In the above formula, f is a positive number of 2 to 12, preferably 2 to 6, more preferably 3, g is a positive number of 2 to 4, preferably 2 and 3, more preferably 2 or the combination of 2 and 3, and h is a positive number of 1 to 200, preferably 1 to 100, more preferably 1 to 50.

Examples of $R^4$ include hydrogen atom, methyl group and hydroxyl group, although hydrogen atom is preferred.

In the above formula, n is an integer of 1 to 20, preferably 1 to 10, more preferably 1 to 5.

The content of the modified silicone is 0.01 to 20% by weight, preferably 0.1 to 10% by weight, and more preferably 0.1 to 5% by weight based on the aqueous slicing fluid. Less than 0.01 wt % leads to a lowering of machining accuracy whereas more than 20 wt % leads to formation of insolubles.

In a preferred embodiment, the slicing fluid further comprises (B) 1 to 20% by weight of water and (C) 60 to 98.99% by weight of a hydrophilic polyhydric alcohol and/or a derivative thereof. In a more preferred embodiment, the slicing fluid further comprises (B) 10 to 20% by weight of water and (C) 80 to 95% by weight of a hydrophilic polyhydric alcohol and/or a derivative thereof. Less than 1 wt % of water may lead to such problems as a lowering of machining accuracy whereas addition of more than 20 wt % of water may result in the aqueous slicing fluid having such problems as a low viscosity stability. Less than 60 wt % of the hydrophilic polyhydric alcohol and/or derivative thereof may lead to a lowering of abrasive dispersion whereas more than 98.99 wt % may lead to a lowering of machining accuracy.

Examples of the hydrophilic polyhydric alcohol and derivative thereof (C) include ethylene glycol, diethylene glycol, triethylene glycol, dipropylene glycol, tripropylene glycol, and polyethylene glycol. Of the polyethylene glycols, those having an average molecular weight of 200 to 1,000 are preferred. For example, polyethylene glycol 200 and 400 are used. Preferably the hydrophilic polyhydric alcohol or derivative thereof (C) has a solubility in water of at least 5% by weight at 20° C. and a vapor pressure of up to 0.01 mmHg. If the solubility in water is less than 5% by weight at 20° C., there may arise a problem that an organic solvent must be used in wafer cleaning. A vapor pressure above 0.01 mmHg may give rise to a risk of ignition during slicing operation.

The inventive aqueous slicing slurry comprises 100 parts by weight of the aqueous slicing fluid consisting of components (A) to (C) and 50 to 200 parts by weight of abrasive grains. Suitable abrasive grains include silicon carbide, alumina, and diamond. Silicon carbide and diamond are more suitable. A slurry containing less than 50 pbw of abrasive grains may be less effective in that a longer time is taken in slicing of silicon ingots. More than 200 pbw of abrasive grains may interfere with dispersion.

Additives such as defoamers, water-soluble polymers, mica, hydrophobic silica and carboxylic acids may be added to the aqueous slicing fluid and slurry as long as their properties are not impaired.

In general, a multi-wire saw has two guide rollers which have grooves engraved at definite intervals. The wires are wound in the grooves of the guide rollers and kept in parallel at a definite tension.

While slicing a sample to be worked, the slurry is provided to the wires and the wires are caused to run at a high rate in two-way or one-way direction. A table having the sample to be worked put on goes down to the wires from the upper position, whereby the sample is slice to a large number of products having the same shape at the same time.

Alternatively, the table with the sample may go up as the work ascending procedure instead of the work descending procedure.

In the multi-wire saw slicing, a series of steps of providing the slurry containing abrasive grains to the wires and slicing the sample to be worked with the wires adhering to the slurry is an important operation.

EXAMPLES

Examples and Comparative Examples are given below by way of illustration and not by way of limitation. All parts and % are by weight.

Example 1

A fluid, designated M-1, was prepared by admixing 13% of deionized water, 18% of PEG200, and 68% of diethylene glycol, and adding thereto 1% of polyether-modified silicone represented by the formula: $R^2_{2.21} R^3_{0.27} SiO_{0.76}$ wherein $R^2$ is methyl group and $R^3$ is —$C_3 H_6 O(C_2 H_4 O)_{7.6} H$. The fluid was combined with silicon carbide (SiC) grains (Shinano Electric Refining Co., Ltd., GP#1000, average particle size 11 μm) and agitated until an aqueous slurry for use in slicing of silicon ingots was obtained.

The aqueous slicing slurry was measured for dynamic contact angle and evaluated for dispersion stability of abrasive grains by measuring the average particle size immediately after its preparation and after 24 hours of static holding. The results are shown in Table 3. The slurry was also evaluated for viscosity stability and machining accuracy by slicing a silicon ingot under the following conditions. The results are also shown in Table 3.

<Slicing Conditions>
Slicing tool: multi-wire saw
Wire diameter: 0.14 mm
Abrasive grains: silicon carbide (Shinano Electric Refining Co., Ltd., GP#1000, average particle size 11 μm)
Silicon ingot: polycrystalline silicon, size 125 mm square, length 90 mm
Slicing pitch: 0.40 mm
Slicing speed: 0.3 mm/min
Wire reciprocation speed: 600 m/min
The measurement of each property is conducted as follows.

<<Evaluation>>

<Dynamic Contact Angle>
Using a contact angle meter (model CA-D, Kyowa Interface Science Co., Ltd.), the contact angle of a droplet on a glass plate was measured 30 seconds after dispensing of the aqueous slurry.

<Dispersion Stability of Abrasive Grains>
Using a laser scattering diffraction particle size distribution analyzer Cilas 1064 by Cilas, the aqueous slicing slurry was measured for average particle size immediately after its preparation and after 24 hours of static holding. An increment of particle size was computed.

Increment of particle size=(average particle size after 24 hours)/(average particle size as prepared)

<Viscosity Stability of Aqueous Slicing Slurry>
Using a Brookfield viscometer, the aqueous slicing slurry was measured for viscosity before and after the silicon ingot slicing operation. A percent viscosity increase was computed.

<Machining Accuracy after Slicing>
After slicing, a wafer as sliced was inspected for saw marks on its surface.
○: no saw marks
x: saw marks observed The wafer was also examined for total thickness variation (TTV) and warp or three-dimensional waviness. After a silicon ingot had been slice into wafers, three wafers slice from each of the opposite ends and center of the ingot, total nine wafers were sampled. The thickness of each wafer was measured at four corners and intermediates thereof, total eight points. There were obtained 72 data of thickness measurement in total, from which a standard deviation was computed.

Example 2

An aqueous slicing fluid (M-2) was prepared as in Example 1 aside from using an amino-modified silicone represented by the formula: $R^1_{0.67}R^2_2SiO_{0.67}$ wherein $R^1$ is $—(CH_2)_2NH_2$ and $R^2$ is methyl group as the modified silicone. It was evaluated as in Example 1.

Example 3

An aqueous slicing fluid (M-3) was prepared as in Example 1 aside from using a carboxyl-modified silicone represented by the formula: $R^1_{0.33}R^2_{2.33}SiO_{0.67}$ wherein $R^1$ is $—(CH_2)_2COOH$ and $R^2$ is methyl group as the modified silicone. It was evaluated as in Example 1.

Example 4

An aqueous slicing fluid (M-4) was prepared as in Example 1 aside from using an epoxy-modified silicone represented by the formula: $R^1_{0.67}R^2_2SiO_{0.67}$ wherein $R^1$ is

[Chemical Formula 1]
$$—(CH_2)_2—\underset{\underset{O}{\diagdown\diagup}}{CH-CH_2}$$

and $R^2$ is methyl group as the modified silicone. It was evaluated as in Example 1.

Examples 5 to 11 and Comparative Examples 1 to 7

As in Example 1, an aqueous slicing fluid (M-5 to M-18) was prepared by mixing and agitating amounts of components as shown in Tables 1 and 2. As in Example 1, the fluid was combined with SiC grains (Shinano Electric Refining Co., Ltd., GP#1000, average particle size 11 μm) and agitated until an aqueous slurry was obtained. The aqueous slicing slurry was measured for dynamic contact angle and evaluated for dispersion stability of abrasive grains by measuring the average particle size immediately after its preparation and after 24 hours of static holding. The results are shown in Tables 3 and 4. The slurry was also evaluated for viscosity stability and machining accuracy by slicing a silicon ingot under the same conditions as in Example 1. The results are also shown in Tables 3 and 4.

TABLE 1

|  | Compounding amount (%) | Example |  |  |  |  |  |  |  |  |  |  |
|---|---|---|---|---|---|---|---|---|---|---|---|---|
|  |  | 1 M-1 | 2 M-2 | 3 M-3 | 4 M-4 | 5 M-5 | 6 M-6 | 7 M-7 | 8 M-8 | 9 M-9 | 10 M-10 | 11 M-11 |
| (A) | Polyether-modified silicone | 1 |  |  |  | 0.1 | 5 | 1 | 0.05 | 18 | 1 | 1 |
|  | Amino-modified silicone |  | 1 |  |  |  |  |  |  |  |  |  |
|  | Carboxyl-modified silicone |  |  | 1 |  |  |  |  |  |  |  |  |
|  | Epoxy-modified silicone |  |  |  | 1 |  |  |  |  |  |  |  |
|  | Noigen TDS-30 |  |  |  |  |  |  |  |  |  |  |  |
|  | Noigen TDS-80 |  |  |  |  |  |  |  |  |  |  |  |
| (B) | Water | 13 | 13 | 13 | 13 | 13 | 12.4 | 13 | 13 | 13 | 13 | 13 |
| (C) | Diethylene glycol | 68 | 68 | 68 | 68 | 68.9 | 65.5 | 68 | 86.95 | 69 | 68 | 68 |
|  | PEG200 | 18 | 18 | 18 | 18 | 18 | 17.1 |  |  |  | 18 | 18 |
|  | PEG400 |  |  |  |  |  |  | 18 |  |  |  |  |
|  | Amount (pbw) of SiC added to aqueous slicing fluid | 100 | 100 | 100 | 100 | 100 | 100 | 100 | 100 | 100 | 60 | 180 |

TABLE 2

| Compounding amount (%) | Comparative Example | | | | | | |
|---|---|---|---|---|---|---|---|
| | 1 M-12 | 2 M-13 | 3 M-14 | 4 M-15 | 5 M-16 | 6 M-17 | 7 M-18 |
| (A) Polyether-modified silicone | | | 30 | 0.005 | 0.005 | 25 | 25 |
| Amino-modified silicone | | | | | | | |
| Noigen TDS-30 | 1 | | | | | | |
| Noigen TDS-80 | | 1 | | | | | |
| (B) Water | 13 | 13 | 8 | 13 | | 10 | 10 |
| (C) Diethylene glycol | 68 | 68 | 44 | 68.995 | 99.995 | 46 | 46 |
| PEG200 | 18 | 18 | 18 | | | 19 | 19 |
| PEG400 | | | | 18 | | | |
| Amount (pbw) of SiC added to aqueous slicing fluid | 100 | 100 | 100 | 100 | 100 | 40 | 220 |

Noigen TDS-30: trade mark of Dai-Ichi Kogyo Seiyaku Co., Ltd., RO(CH$_2$CH$_2$)$_n$OH, R = 13 carbons, n = 3
Noigen TDS-80: trade mark of Dai-Ichi Kogyo Seiyaku Co., Ltd., RO(CH$_2$CH$_2$)$_n$OH, R = 13 carbons, n = 8
PEG200: trade mark of Sanyo Chemical Industries Ltd., polyethylene glycol, average molecular weight 200
PEG400: trade mark of Sanyo Chemical Industries Ltd., polyethylene glycol, average molecular weight 400
Vapor pressure (mmHg) and Solubility in water (20° C.)
Diethylene glycol <0.01 mmHg; Soluble (at least 5 parts by weight)
PEG200 <0.001 mmHg; Soluble (at least 5 parts by weight)
PEG400 <0.001 mmHg; Soluble (at least 5 parts by weight)

TABLE 3

| | Example | | | | | | | | | | |
|---|---|---|---|---|---|---|---|---|---|---|---|
| | 1 M-1 | 2 M-2 | 3 M-3 | 4 M-4 | 5 M-5 | 6 M-6 | 7 M-7 | 8 M-8 | 9 M-9 | 10 M-10 | 11 M-11 |
| Dynamic contact angle, ° | 12 | 19 | 22 | 21 | 14 | 11 | 13 | 15 | 9 | 15 | 14 |
| Increment of particle size | 1 | 1.3 | 1.4 | 1.4 | 1 | 1 | 1 | 1.3 | 1.2 | 1.1 | 1.1 |
| Increase of slurry viscosity, % | 0 | 10 | 10 | 10 | 3 | 1 | 2 | 4 | 7 | 5 | 7 |
| Saw marks | ○ | ○ | ○ | ○ | ○ | ○ | ○ | ○ | ○ | ○ | ○ |
| TTV, μm | 9 | 15 | 19 | 20 | 10 | 11 | 10 | 13 | 12 | 11 | 13 |
| Warp, μm | 4 | 9 | 13 | 13 | 6 | 3 | 5 | 8 | 7 | 5 | 4 |

TABLE 4

| | Comparative Example | | | | | | |
|---|---|---|---|---|---|---|---|
| | 1 M-12 | 2 M-13 | 3 M-14 | 4 M-15 | 5 M-16 | 6 M-17 | 7 M-18 |
| Dynamic contact angle, ° | 32 | 31 | 12 | 27 | 25 | 9 | 10 |
| Increment of particle size | 1.8 | 2.3 | 1.8 | 1.9 | 2.1 | 2 | 3 |
| Increase of slurry viscosity, % | 10 | 12 | 8 | 15 | 20 | 21 | 23 |
| Saw marks | X | X | X | X | X | X | X |
| TTV, μm | 34 | 37 | 27 | 29 | 30 | 26 | 25 |
| Warp, μm | 26 | 26 | 19 | 21 | 22 | 20 | 20 |

The invention claimed is:

1. An aqueous slicing slurry comprising
   100 parts by weight of an aqueous slicing fluid and 50 to 200 parts by weight of silicon carbide,
   wherein the aqueous slicing fluid comprising
   (A) 0.01 to 20% by weight of a modified silicone selected from the group consisting of polyether-modified silicones, amino-modified silicones, carboxyl-modified silicones, and epoxy-modified silicones,
   (B) 1 to 20% by weight of water, and
   (C) 60 to 98.99% by weight of diethylene glycol and polyethylene glycol
   wherein the modified silicone is one represented by the following average compositional formula (1):

$$R^1_p R^2_q R^3_r SiO_{(4-p-q-r)/2} \qquad (1)$$

wherein $R^1$ is $-(CR^4_2)_n X$, $R^4$ is hydrogen atom, a substituted or unsubstituted monovalent hydrocarbon group having 1 to 20 carbon atoms and having no aliphatic unsaturated bond, or hydroxyl group, n is an integer of 1 to 20, X is a functional group selected from the group consisting of an amino group, carboxyl group and epoxy group, $R^2$ is a substituted or unsubstituted monovalent hydrocarbon group having 1 to 20 carbon atoms and having no aliphatic unsaturated bond, $R^3$ is an organic group having the general formula: $-C_f H_{2f} O(C_g H_{2g} O)_h R^5$, $R^5$ is hydrogen atom, a substituted or unsubstituted monovalent hydrocarbon group having no aliphatic unsaturated bond, or acetyl group, f is a positive number of 2 to 12, g is a positive number of 2 to 4, h is a positive number of 1 to 200, and p, q and r are numbers satisfying $0 \leq p < 2.5$, $0.01 \leq q < 2.5$, $0 \leq r < 2.5$ and $0.05 < p+q+r \leq 3.0$.

2. A method of slicing an ingot of silicon, quartz, rock crystal, compound semiconductor, or magnet alloy, comprising slicing the ingot with a multi-wire saw by using the aqueous slicing slurry of claim 1.

3. The method of claim 2 wherein the ingot to be sliced is a silicon ingot.

* * * * *